(12) United States Patent
Bernat et al.

(10) Patent No.: US 11,451,435 B2
(45) Date of Patent: Sep. 20, 2022

(54) TECHNOLOGIES FOR PROVIDING MULTI-TENANT SUPPORT USING ONE OR MORE EDGE CHANNELS

(71) Applicant: Intel Corporation, Santa Clara, CA (US)

(72) Inventors: Francesc Guim Bernat, Barcelona (ES); Karthik Kumar, Chandler, AZ (US); Benjamin Graniello, Chandler, AZ (US); Timothy Verrall, Pleasant Hill, CA (US); Andrew J. Herdrich, Hillsboro, OR (US); Rashmin Patel, Chandler, AZ (US); Monica Kenguva, Phoenix, AZ (US); Brinda Ganesh, Portland, OR (US); Alexander Vul, San Jose, CA (US); Ned M. Smith, Beaverton, OR (US); Suraj Prabhakaran, Aachen (DE)

(73) Assignee: INTEL CORPORATION, Santa Clara, CA (US)

(*) Notice: Subject to any disclaimer, the term of this patent is extended or adjusted under 35 U.S.C. 154(b) by 110 days.

(21) Appl. No.: 16/367,626

(22) Filed: Mar. 28, 2019

(65) Prior Publication Data

US 2020/0076682 A1 Mar. 5, 2020

(51) Int. Cl.
*H04L 41/0803* (2022.01)
*H04L 41/5041* (2022.01)

(52) U.S. Cl.
CPC ...... *H04L 41/0803* (2013.01); *H04L 41/5041* (2013.01)

(58) Field of Classification Search
CPC . H04L 41/16; H04L 41/0803; H04L 41/5041; H04L 41/0896; H04L 67/34;
(Continued)

(56) References Cited

U.S. PATENT DOCUMENTS 6,345,239 B1 * 2/2002 Bowman-Amuah ........................
G06Q 30/0639
705/26.9
7,069,337 B2 * 6/2006 Rawlins .................. H04L 47/20
709/249

(Continued)

OTHER PUBLICATIONS

C. You, K. Huang, H. Chae and B. Kim, "Energy-Efficient Resource Allocation for Mobile-Edge Computation Offloading," in IEEE Transactions on Wireless Communications, vol. 16, No. 3, pp. 1397-1411, Mar. 2017, doi: 10.1109/TWC.2016.2633522. (Year: 2016).*

*Primary Examiner* — James N Fiorillo
(74) *Attorney, Agent, or Firm* — Hanley, Flight & Zimmerman, LLC (57) ABSTRACT

Technologies for providing multi-tenant support in edge resources using edge channels include a device that includes circuitry to obtain a message associated with a service provided at the edge of a network. Additionally, the circuitry is to identify an edge channel based on metadata associated with the message. The edge channel has a predefined amount of resource capacity allocated to the edge channel to process the message. Further, the circuitry is to determine the predefined amount of resource capacity allocated to the edge channel and process the message using the allocated resource capacity for the identified edge channel.

18 Claims, 6 Drawing Sheets

(58) Field of Classification Search
CPC ..... H04L 47/76; H04L 12/24; H04L 41/0677;
H04L 45/302; G06Q 20/10; G06Q 20/3674
USPC .................................................. 709/226, 249
See application file for complete search history.

(56) References Cited

U.S. PATENT DOCUMENTS

| | | | | |
|---|---|---|---|---|
| 7,209,439 | B2* | 4/2007 | Rawlins | H04L 47/724 |
| | | | | 370/230 |
| 7,274,662 | B1* | 9/2007 | Kalmanek, Jr. | H04L 47/785 |
| | | | | 370/395.5 |
| 2002/0174227 | A1* | 11/2002 | Hartsell | H04L 41/5022 |
| | | | | 709/224 |
| 2014/0032781 | A1* | 1/2014 | Casey | H04L 65/80 |
| | | | | 709/233 |
| 2015/0339136 | A1* | 11/2015 | Suryanarayanan | G06F 9/452 |
| | | | | 718/1 |
| 2016/0344604 | A1* | 11/2016 | Raleigh | G06F 9/54 |
| 2017/0083354 | A1* | 3/2017 | Thomas | G06F 9/5027 |
| 2017/0310581 | A1* | 10/2017 | Endo | H04L 41/0677 |
| 2017/0353980 | A1* | 12/2017 | Strijkers | H04W 76/10 |
| 2018/0375764 | A1* | 12/2018 | Filsfils | H04L 12/4633 |
| 2019/0020657 | A1* | 1/2019 | Egner | G06Q 20/3674 |
| 2019/0158370 | A1* | 5/2019 | You | H04L 43/0811 |
| 2019/0253274 | A1* | 8/2019 | Van Dussen | H04L 41/0806 |
| 2019/0363787 | A1* | 11/2019 | Edwards | H04B 10/032 |
| 2019/0392328 | A1* | 12/2019 | Gil Bulacio | H04L 41/14 |

* cited by examiner

| VEC | USED_CREDITS | TOTAL_CREDITS | AGENT | RING_TYPE |
|---|---|---|---|---|
| VEC_ID | #USED | #RSD | AGENT_ID | RING_TYPE |
| ... | ... | ... | ... | ... |
| 4 | 2 | 6 | HFI_1 | BL (Data) |

TECHNOLOGIES FOR PROVIDING MULTI-TENANT SUPPORT USING ONE OR MORE EDGE CHANNELS

BACKGROUND

An emerging paradigm in computing is edge computing, in which client compute devices (e.g., compute device(s) in a vehicle, etc.) located at an edge of a network (e.g., along a roadside) utilize memory and/or compute resources located at the edge (e.g., available at an edge location, such as a small cell, a base station, etc.) to provide lower latency services than would be possible if requests were routed to a cloud data center at the core of a network (e.g., at a central office). In operation, edge resources may receive vast amounts of transactions from the various client compute devices with varying latency requirements. The system may be heavily under provisioned to satisfy the lowest common denominator (i.e., a tenant that has the lowest latency requirement). However, heavily under provisioning may be problematic given that devices at edge locations are resource constrained (e.g., as compared to compute devices in a cloud data center).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
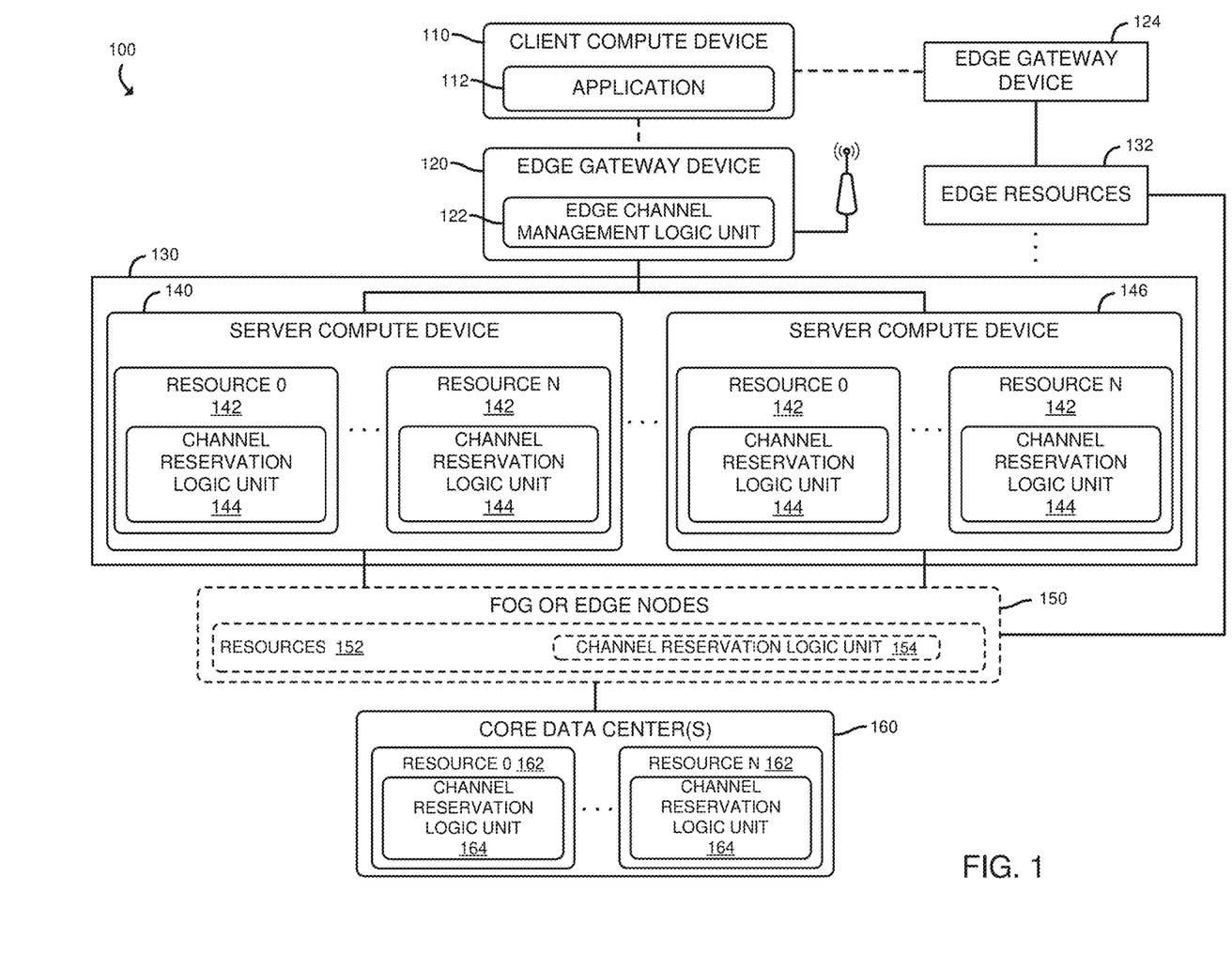
FIG. 1 is a simplified diagram of at least one embodiment of a system for providing multi-tenant support in edge resources using edge channels.

Referring now to FIG. 1, a system 100 for providing multi-tenant support in edge resources using edge channels to manage multi-tenant loads with varying latency requirements includes a client compute device 110 in communication with an edge gateway device 120. The edge gateway device 120, 124 may be embodied as any device capable of communicating data between the client compute device 110 and one or more edge resources 130, 132 (e.g., server compute devices 140, 146) at the same or different edge locations, which may be owned and/or operated by one or more service providers, such as cellular network operators) or other compute devices located in a cloud. The edge gateway device 120, 124 and the edge resources 130, 132 in the illustrative embodiment, are positioned at one or more locations (e.g., in small cell(s), base station(s), etc.) along the edge (e.g., in an edge network) of a cloud.

An edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 150), which may be embodied as a system-level horizontal architecture that distributes resources and services of computing, storage, control and networking anywhere between a core data center 160 (e.g., a data center that is further away from and in a higher level of a hierarchy of the system 100 than the edge resources 130, and that includes multiple compute devices capable of executing one or more services (e.g., processes on behalf of one or more clients)) and an endpoint device (e.g., the client compute device 110).

As discussed in more detail herein, in the illustrative embodiment, the edge gateway device 120 includes an edge channel management logic unit 122, which may be embodied as any device or circuitry (e.g., a processor, a co-processor, reconfigurable circuitry, a field programmable gate array (FPGA), an application specific integrated circuit (ASIC), etc.) configured to define one or more edge channels to manage multi-tenant loads with varying latency requirements. To do so, the edge channel management logic unit 122 may include an edge channel table that may be updated by one or more service providers to define one or more edge channels. Each edge channel is an end-to-end dedicated communication path between individuals or groups of edge devices to a service including every resource used by the service to execute messages or transactions associated with the service. The edge channel may connect different resources in the platform and different resources between platforms to create a communication path dedicated to provide a particular service and/or to a particular tenant (e.g., a service provider). For example, each edge channel may be associated to one tenant and potentially to different services and individuals or groups of edge devices. In other words, the edge channel may be mapped to one or more multiple edge devices or edge workloads. Additionally, the edge channel may be used to connect different resources in different edge locations. For example, services on an edge network may use an edge channel to access to different edge resources on a different edge location. Each entry of the edge channel table includes an edge channel identifier (i.e., an edge channel ID) that uniquely identifies an edge channel, a set of resources, and a predefined amount of those resources allocated to the edge channel. As such, defining edge channels (thereby allocating resources to each edge channel) allows the edge network to support various concurrent applications and multiple tenants with varying loads (e.g., by distributing the load based on latency requirements).

As discussed in more detail below, in use, the edge channel management logic unit 122 may communicate with channel reservation logic units 144, 154, 164 of the system 100 to configure every resource participating in an end-to-end communication path from an edge computing device to a final execution of the service to understand edge channel semantics. In the illustrative embodiment, the final execution of the service may be one or more resources in the server compute device 140, the fog or edge node 150, or the core data center 160. The edge channel ID may be used to monitor and control the usage of allocated resources for the edge channel. For example, a service provider may provide a navigation service to client compute devices 110. In that example, the service provider may define an edge channel that is designated to process transactions or messages received from one or more client compute devices 110 executing a navigation application. To do so, the service provider may program the edge channel management logic unit 122 to allocate a set of resources that are required to provide the navigation service and a predefined amount of resource capacity of those resources for that particular edge channel. For example, the resource capacity may be processor capacity (e.g., a number of cores to be used, a clock speed, a percentage of available processor cycles, etc.), memory resource capacity (e.g., amount of memory to be used and/or frequency of memory accesses to volatile memory and/or non-volatile memory), and/or communication circuitry capacity (e.g., network bandwidth). It should be appreciated that, in some embodiments, the predefined amount of resource capacity of the resources may be dynamically adjustable. Subsequently, the edge channel management logic unit 122 communicates with the channel reservation logic units 144, 154, 164 to reserve the predefined amount of resource capacity for the navigation edge channel. As such, when an edge device receives a message that includes an edge channel ID associated with the navigation edge channel, the message is sent to the resources allocated to the edge channel ID via the dedicated navigation edge channel.

It should be appreciated that, in the illustrative embodiment, the edge channel management logic unit 122 is configured to perform the similar functions of the channel reservation logic units 144, 154, 164. This allows the edge channel management logic unit 122 to allocate the predefined amount of resource capacity of resources within the edge gateway device 120. Although it is not shown in FIG. 1, each resource in the edge gateway device 120 may include a channel reservation logic unit in each of its resources to understand the edge channel semantics (e.g., to process a message or transaction with an edge channel ID) and to reserve a predefined amount of resource capacity for each edge channel. It should also be appreciated that, in some embodiments, the edge channel management logic unit 122 may be located in the communication path between the edge gateway device 120 and the resources 130.

As discussed in more detail herein, in the illustrative embodiment, the edge resources 130, which may include multiple server compute devices 140, 146, and other resources 152, 162 in the fog or edge nodes 150 or the core data centers 160, respectively, process a message or transaction associated with (e.g., provided by, accessed by, etc.) client compute devices (e.g., data produced or utilized by an application 112 executed by the client compute device 110).

In the illustrative embodiment, the server compute device 140, 146 includes one or more resources 142. Each resource 142 includes the channel reservation logic unit 144, which may be embodied as any device or circuitry (e.g., a processor, a co-processor, reconfigurable circuitry, a field programmable gate array (FPGA), an application specific integrated circuit (ASIC), etc.) configured to communicate with the edge channel management logic unit 122 and to allocate a predefined amount of corresponding resource(s) to each edge channel. As discussed above, every resource participating in an end-to-end communication path from an edge computing device to a final execution of the service includes a channel reservation logic unit. As such, in the illustrative embodiment, each resource in each different platform (e.g., the edge gateway device 120, the fog or edge node(s) 150 or the core data center 160) also includes a channel reservation logic unit that is similar to the channel reservation logic unit 144.

Figure 5:
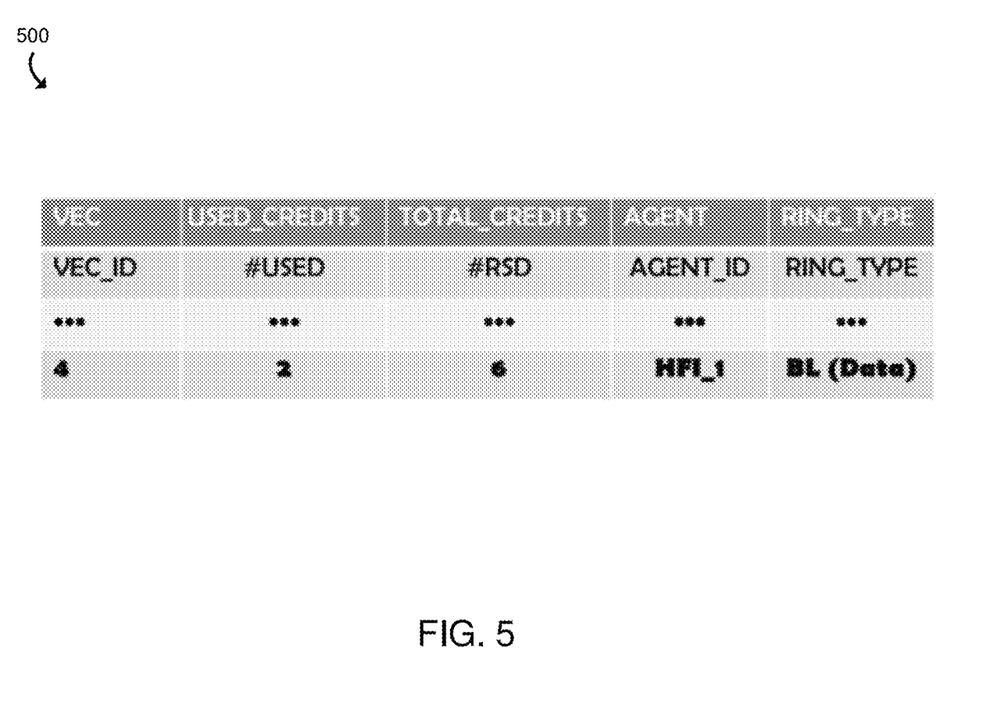
FIG. 5 is a simplified diagram of at least one embodiment of a credit table stored in each edge resource.

In some embodiments, the channel reservation logic unit 144 may include a credit table and/or a reserved resource usage table. The credit table may be configured to establish a credit mechanism by indicating, for each channel ID, a number of requests that may be generated from one resource to another resource (e.g., a potential target or destination resource) using the associated edge channel. For example, the credit table 500 shown in FIG. 5 includes an edge channel ID (also referred to as a virtual edge channel (VEC) ID) that uniquely identifies an edge channel, a target resource (also referred to as an agent), a number of total credits assigned to the edge channel to communicate with the target resource, a number of credits being used to communicate with the target resource, and a communication type (e.g., a ring type). Additionally, the reserved resource usage table may be configured to monitor the usage of the resource allocated to each edge channel. By utilizing the credit table and/or the reserved resource usage table, the channel reservation logic unit 144 may prevent other data from utilizing the resource allocated to particular edge channels and ensure that the edge channels can use the allocated bandwidth or resource capacity of the resource.

Figure 2:
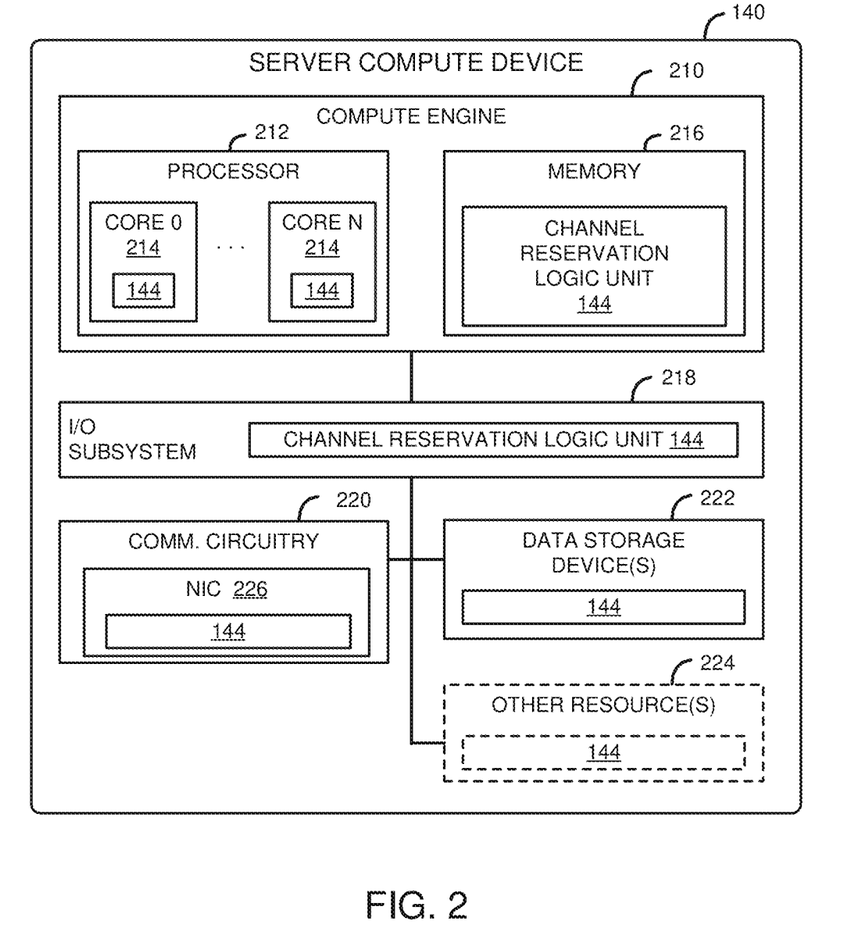
FIG. 2 is a simplified block diagram of at least one embodiment of a server compute device included in the system of FIG. 1.

Referring now to FIG. 2, the illustrative server compute device 140 includes a compute engine (also referred to herein as "compute engine circuitry") 210, an input/output (I/O) subsystem 218, communication circuitry 220, and one or more data storage devices 222. It should be appreciated that, in other embodiments, the client compute device 110 may include other or additional components 224, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as the processor 212 and a memory 216. The processor 212 may be embodied as any type of processor capable of performing the functions described herein (e.g., executing the application 112). In the illustrative embodiment, the processor 212 is embodied as a multi-core processor having multiple cores 214. Each core 214 includes the channel reservation logic unit 144 described above with reference to FIG. 1. It should be appreciated that, in some embodiments, the processor 212 may be embodied as a microcontroller or other processor or processing/controlling circuit. In other embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

The main memory 216 may be embodied as any type of volatile (e.g., dynamic random access memory (DRAM), etc.) or non-volatile memory or data storage capable of performing the functions described herein. In the illustrative embodiment, the main memory 216 includes the channel reservation logic unit 144 described above with reference to FIG. 1. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 216 may be integrated into the processor 212. In the illustrative embodiment, the memory 216 includes the local memory, which may be of one type (e.g., DRAM) and the shared memory, which may be of another type (e.g., memory having a cross point architecture). The main memory 216 may store various software and data used during operation such as one or more applications (the application 112), data operated on by the application(s), libraries, and drivers.

The compute engine 210 is communicatively coupled to other components of the server compute device 140 via the I/O subsystem 218, which may be embodied as circuitry and/or components to facilitate input/output operations with the compute engine 210 (e.g., with the processor 212 and/or the main memory 216) and other components of the server compute device 140. For example, the I/O subsystem 218 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 218 may form a portion of a system-on-a-chip (SoC) and be incorporated, along with one or more of the processor 212, the main memory 216, and other components of the server compute device 140, into the compute engine 210.

The communication circuitry 220 may be embodied as any communication circuit, device, or collection thereof, capable of enabling communications over a network between the server compute device 140 and another compute device (e.g., the edge gateway device 120, the client compute device 110, the server compute device 146, etc.). The communication circuitry 220 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 220 includes a network interface controller (NIC) 226, which may also be referred to as a host fabric interface (HFI). The NIC 226 may be embodied as one or more add-in-boards, daughter cards, network interface cards, controller chips, chipsets, or other devices that may be used by the server compute device 140 to connect with another compute device (e.g., the edge gateway device 120, the client compute device 110, the server compute device 140, etc.). In some embodiments, the NIC 226 may be embodied as part of a system-on-a-chip (SoC) that includes one or more processors, or included on a multichip package that also contains one or more processors. In some embodiments, the NIC 226 may include a local processor (not shown) and/or a local memory (not shown) that are both local to the NIC 226. In such embodiments, the local processor of the NIC 226 may be capable of performing one or more of the functions of the compute engine 210 described herein. Additionally or alternatively, in such embodiments, the local memory of the NIC 226 may be integrated into one or more components of the server compute device 140 at the board level, socket level, chip level, and/or other levels. In the illustrative embodiment, the NIC 226 includes the channel reservation logic unit 144 described above with reference to FIG. 1.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

In some embodiments, the server compute device 140 may include one or more accelerator device(s) (not shown), which may be embodied as any device(s) or circuitries configured to execute a set of operations faster than the 212 is capable of executing the operations. It should be appreciated that, in such embodiments, each of the accelerator devices may include the channel reservation logic unit 144 described above with reference to FIG. 1. The accelerator device(s) may also include one or more field programmable gate arrays (FPGAs), each of which may be embodied as a set (e.g., a matrix) of logic gates that can be configured to perform a set of operations according to a defined configuration (e.g., a bit stream). The accelerator device(s) may additionally or alternatively include an artificial intelligence accelerator, which may be embodied as which may be embodied as any device or circuitry (e.g., a programmable logic chip, a processor, etc.) configured to perform artificial intelligence related operations (e.g., matrix multiplication, vector operations, machine learning training operations, machine learning inference operations, etc.). Additionally or alternatively, the accelerator device(s) may include a cryptography accelerator, which may be embodied as any device or circuitry (e.g., a programmable logic chip, a processor, etc.) configured to perform operations related to cryptographic operations (e.g., data encryption, data decryption, identity authentication, etc.). Additionally or alternatively the accelerator device(s) may include other types of devices, such as one or more application specific integrated circuits (ASICs).

Additionally, in some embodiments, the server compute device 140 may include a main channel reservation logic unit (similar to the channel reservation logic unit 144 of FIG. 1) located outside of each of the resources but within the server compute device 140 to understand the edge channel semantics to allocate the resources within the server compute device 140 to the edge channel(s) and process a message from an edge device using resources allocated to the edge channel identified in the message.

The server compute device 146, the edge gateway device 120, the fog nodes 150, and the core data center 160, may have components similar to those described in FIG. 2 with reference to the server compute device 140. The description of those components of the server compute device 140 is equally applicable to the description of components of the server compute device 146, the edge gateway device 120, the fog nodes 150, and the core data center 160. Additionally, as discussed above, the edge gateway device 120 performs one or more of the multi-tenant support functions described herein and, as such, the edge channel management logic unit 122 may perform functions similar to the channel reservation logic unit 144. Further, it should be appreciated that any of the server compute devices 140, 146, the edge gateway device 120, the fog nodes 150, and the core data centers 160 may include other components, sub-components, and devices commonly found in a computing device, which are not discussed above in reference to the server compute device 140 and not discussed herein for clarity of the description. Further, it should be understood that one or more components of a compute device may be distributed across any distance, and are not necessarily housed in the same physical unit.

The client compute device 110, the edge gateway device 120, the server compute devices 140, 146, the fog nodes 150, and the core data center 160 are illustratively in communication via a network, which may be embodied as any type of wired or wireless communication network, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
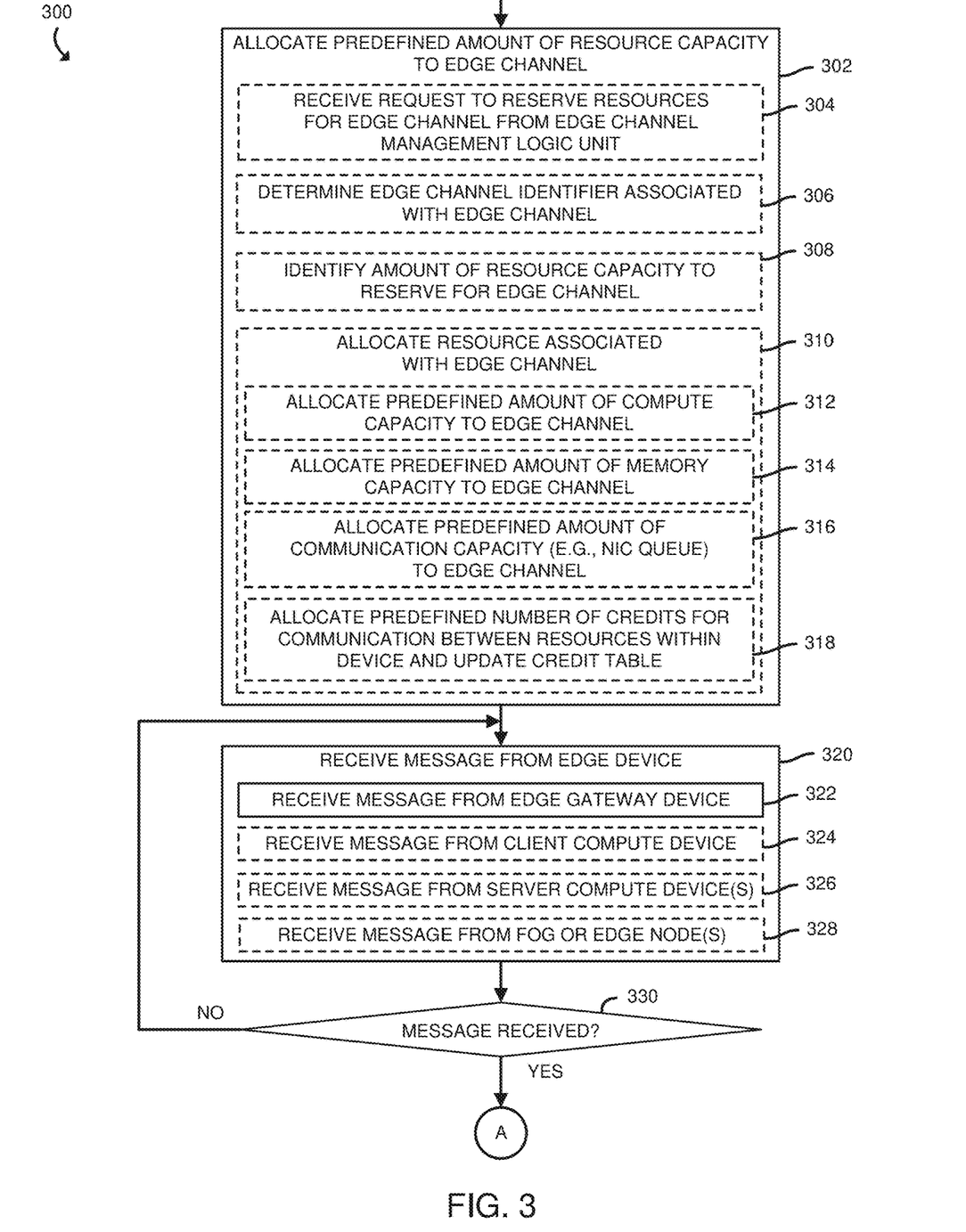
FIGS. 3 and 4 are a simplified block diagram of at least one embodiment of a method for providing multi-tenant support that may be performed by a channel reservation logic unit of a server compute device of FIG. 1.

Referring now to FIG. 3, the channel reservation logic unit 144 of the server compute device 140, 146, in operation, may execute a method 300 for providing multi-tenant support in edge resources using edge channels. As discussed above, the channel reservation logic unit 144, 154, 164 is included in every resource participating in an end-to-end communication path from an edge computing device to a final execution of the service, which may be one or more resources in the server compute device(s) 140, 146, the fog or edge node 150, or a compute device in the core data center 160. As such, the operations of the method 300 may be performed by the channel reservation logic unit 154, 164 to provide multi-tenant support in edge resources in the fog or edge node 150 or a compute device in the core data center 160, respectively. Additionally, the operations of the method 300 may also be performed by the edge channel management logic unit 122 to provide multi-tenant support in edge resources in the edge gateway device 120.

The method 300 begins with block 302 in which the channel reservation logic unit 144 allocates a predefined amount of resource capacity of corresponding resource(s) to an edge channel. As discussed above, the edge channel may connect different resources within a platform, between platforms, or between different edge locations to create a communication path dedicated to provide a particular service and/or to a particular tenant. To do so, the channel reservation logic unit 144 may receive a request to reserve a predefined amount of the resource for an edge channel from the edge channel management logic unit 122, as indicated in block 304. The request from the edge channel management logic unit 122 may include an edge channel identifier (i.e., an edge channel ID) that uniquely identifies an edge channel, a set of resources associated with the edge channel ID, and a predefined amount of those resources allocated to the associated edge channel. As such, in response to receiving the request, the channel reservation logic unit 144 may determine an edge channel ID associated with the edge channel, as indicated in block 306. Additionally, in block 308, the channel reservation logic unit 144 may identify the amount of resource capacity to reserve for the edge channel. As discussed above, the channel reservation logic unit 144 is included in every resource of the server compute device 140. As such, in block 308, each channel reservation logic unit 144 identifies the amount of its corresponding resource that is to be reserved for the edge channel based on the request. For example, the channel reservation logic unit 144 located in the core 214 may identify the amount of its compute capacity to be allocated to the edge channel. Additionally or alternatively, the channel reservation logic unit 144 located in the memory 216 may identify the amount of its memory capacity to be allocated to the edge channel. Additionally or alternatively, the channel reservation logic unit 144 located in the NIC 226 may identify the amount of its communication capacity to be allocated to the edge channel based on the request. In other words, the channel reservation logic unit 144 of each edge resource 142 allocates or reserves a predefined amount of resource capacity to the edge channel based on a request received from the edge channel management logic unit 122. However, it should be appreciated that, in some embodiments, the channel reservation logic unit 144 may reserve any portion of available resource capacity of the corresponding edge resource 142 to the edge channel.

Subsequently, in block 310, the channel reservation logic unit 144 may allocate the resources associated with the edge channel. To do so, the channel reservation logic unit 144 located in the core 214 may allocate the predefined amount of compute capacity of the corresponding core 214 to the edge channel, as indicated in block 312. Additionally or alternatively, the channel reservation logic unit 144 located in the memory 216 may allocate the predefined amount of memory capacity of the corresponding memory 216 to the edge channel, as indicated in block 314. Additionally or alternatively, the channel reservation logic unit 144 located in the NIC 226 may allocate the predefined amount of communication capacity of the corresponding NIC 226 (e.g., NIC queue) to the edge channel, as indicated in block 316. Additionally or alternatively, the channel reservation logic unit 144 may allocate a predefined number of credits reserved for communication between its corresponding resource and other resources within the server compute device 140 (e.g., cores, memories, caching agents, and HFI) and/or between the server compute devices 140, 146 (e.g., NIC and switches) and update the credit table of the corresponding resource, as indicated in block 318.

Subsequently, in block 320, the channel reservation logic unit 144 receives a message from an edge device. In the illustrative embodiment, the channel reservation logic unit 144 receives a message from the edge gateway device 120. However, as discussed above, the method 300 may be executed by the channel reservation logic unit 154, 164 and the edge channel management logic unit 122. In such embodiments, the edge channel management logic unit 122 may receive a message from a client compute device at the edge (e.g., from the client compute device 110), the channel reservation logic unit 154 may receive a message from the server compute device(s) 140, 146, and the channel reservation logic unit 164 may receive a message from the fog or edge node(s), as indicated in blocks 324-328, respectively.

If the channel reservation logic unit 144 determines that a message has not been received in block 330, the method 300 loops back to block 320 to continue waiting for a message. If, however, the channel reservation logic unit 144 determines that the message has been received, the method 300 advances to block 332 of FIG. 4.

Figure 4:
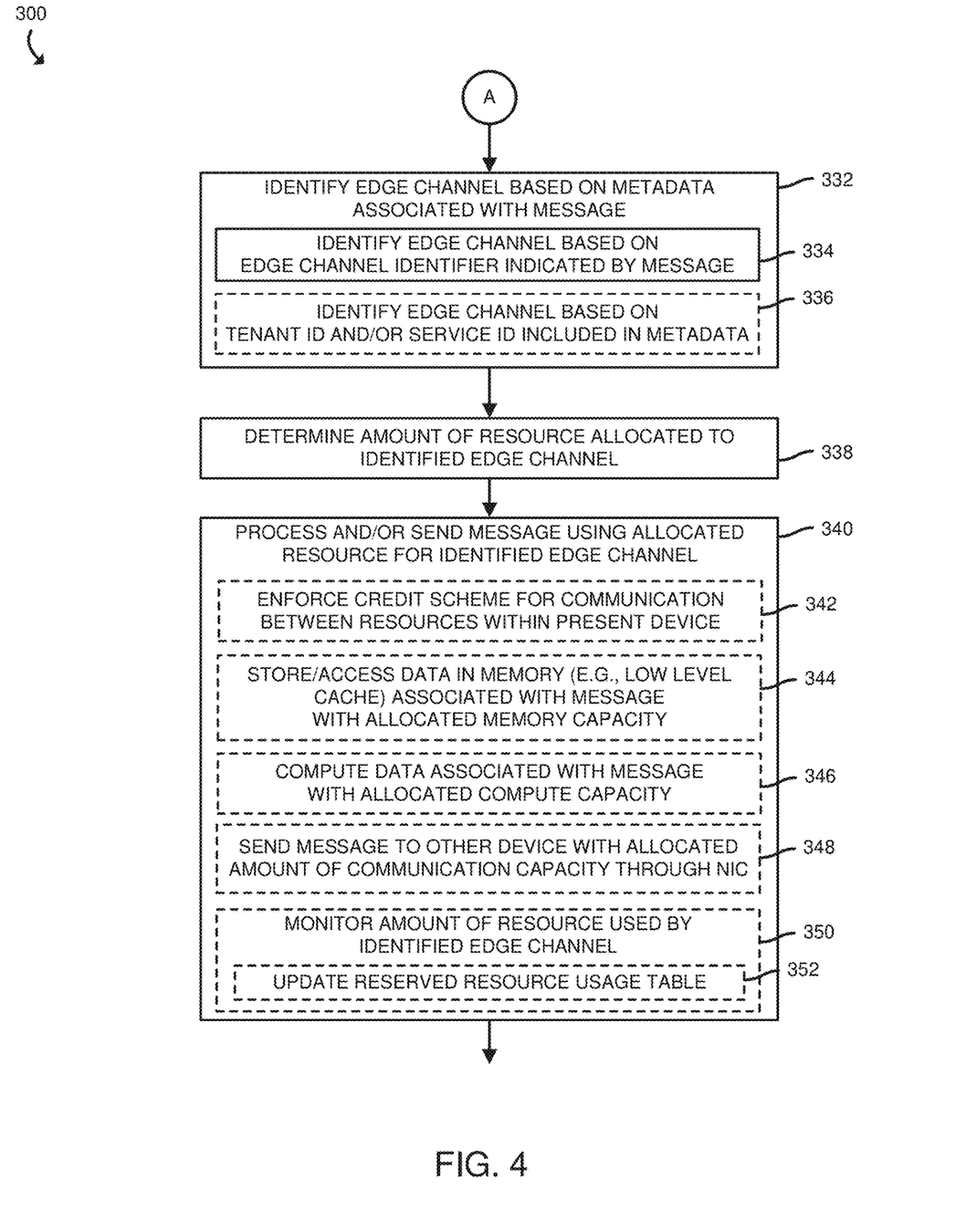

In block 332, the channel reservation logic unit 144 identifies an edge channel based on metadata associated with the message. For example, in the illustrative embodiment, the channel reservation logic unit 144 identifies the edge channel associated with the message based on an edge channel ID indicated in the message, as indicated in block 334. In some embodiments, the channel reservation logic unit 144 may identify the edge channel based on a tenant ID and/or a service ID included in the metadata. For example, an edge channel may be associated to a particular tenant (e.g., a service provider) or a service (e.g., a navigation service) provided by the tenant. Such information may be received from the edge channel management logic unit 122. In such embodiments, if the channel reservation logic unit 144 identifies that the message is associated with a particular tenant ID and/or service ID, the channel reservation logic unit 144 may identify the edge channel that is associated with the tenant ID and/or the service ID. It should be appreciated that the service ID and the tenant ID are a global unique service ID and a global unique tenant ID, respectively, across the infrastructure.

Subsequently, in block 338, the channel reservation logic unit 144 determines an amount of the resource that is allocated or reserved to the identified edge channel (e.g., allocated bandwidth or resource capacity of the resource). As discussed above, such information is received from the edge channel management logic unit 122.

In block 340, the channel reservation logic unit 144 processes and/or sends the message using the allocated resource for the identified edge channel. To do so, in some embodiments, the channel reservation logic unit 144 may enforce the credit scheme for the communication between the resources within the server compute device 140. Additionally or alternatively, the channel reservation logic unit 144 located in the memory 216 may store or access data in the memory 216 (e.g., a low level cache) associated with the message using the predefined amount of memory capacity allocated to the identified edge channel, as indicated in block 344. Additionally or alternatively, the channel reservation logic unit 144 located in the core 214 may compute data associated with the message with the predefined amount of compute capacity of the core 214 allocated to the identified edge channel, as indicated in block 346. Additionally or alternatively, the channel reservation logic unit 144 located in the NIC 226 may send message(s) to other device(s) with the amount of communication capacity allocated to the identified edge channel through the NIC 226, as indicated in block 348.

Additionally or alternatively, in block 350, the channel reservation logic unit 144 may monitor the amount of corresponding resource(s) used by the identified edge channel. In doing so, the channel reservation logic unit 144 may update the reserved resource usage table, as indicated in block 352.

Figure 6:
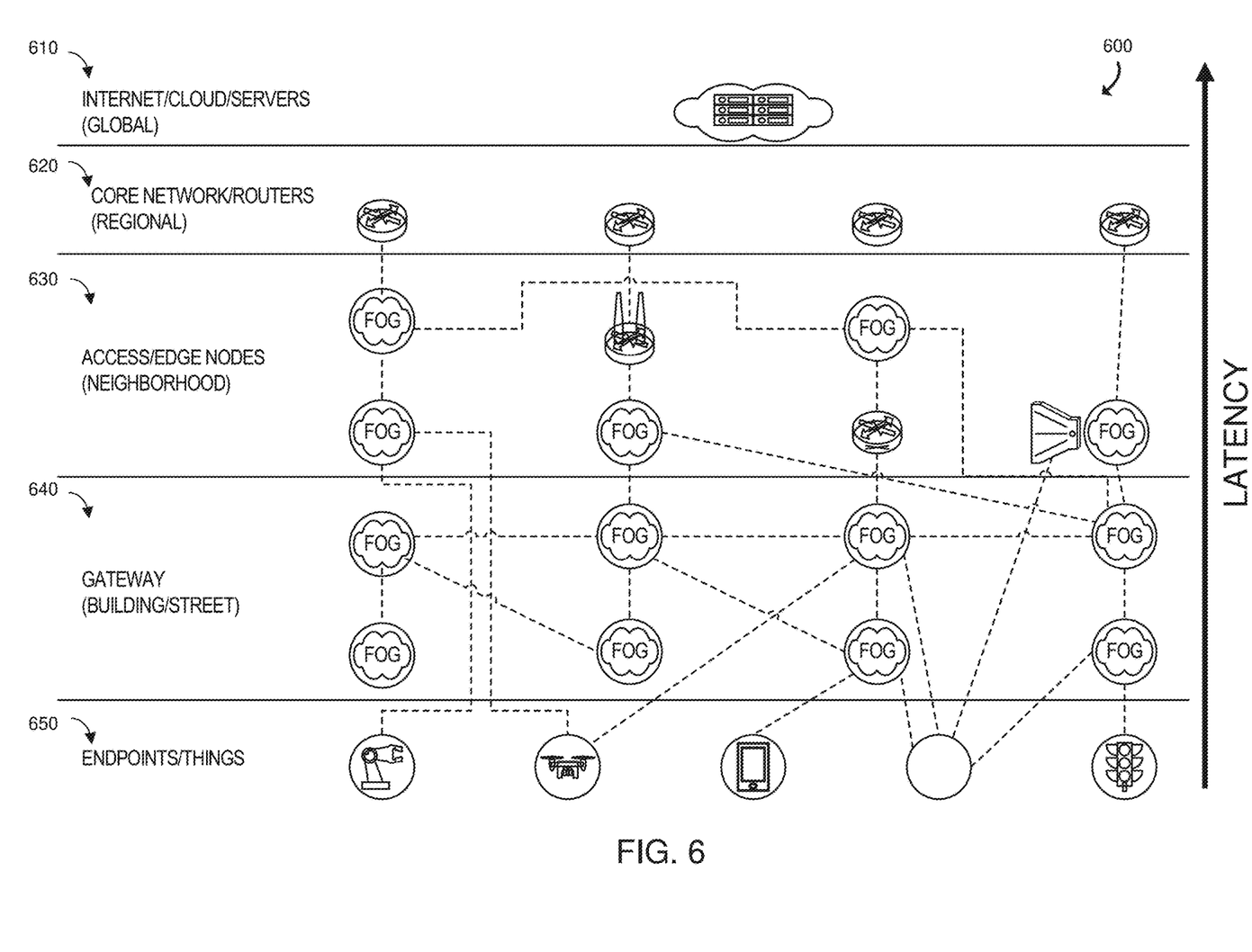
FIG. 6 is a simplified block diagram of a fog and mobile edge computing (MEC) network topology that may be utilized with the system of FIG. 1.

Referring briefly to FIG. 6, a MEC and fog network topology 600 is shown. The network topology 600 includes endpoints (at an endpoints/things network layer 650), gateways (at a gateway layer 640), access or edge computing nodes (e.g., at neighborhood nodes layer 630), core network or routers (e.g., at a regional or central office layer 620), and internet/cloud servers at a global layer 610. A fog network (e.g., established at the gateway layer 640) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 6 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enable providing services (e.g., execution of functions) in a low-latency manner, and, in some embodiments, may utilize features in existing MEC services that provide minimal overhead. It should be appreciated that the system 100 may be applied to non-MEC architecture.

EXAMPLES

Illustrative examples of the technologies disclosed herein are provided below. An embodiment of the technologies may include any one or more, and any combination of, the examples described below.

Example 1 includes a device comprising circuitry to obtain a message associated with a service provided at the edge of a network; identify an edge channel based on metadata associated with the message, the edge channel having a predefined amount of resource capacity allocated to the edge channel to process the message; determine the predefined amount of resource capacity allocated to the edge channel; and process the message using the allocated resource capacity for the identified edge channel.

Example 2 includes the subject matter of Example 1, and wherein the edge channel is configured to connect different resources within the device, between the device and another device located at a same edge location, or between the device and another device located at a different edge location to create a communication path dedicated to provide the message for a particular service and/or to a particular tenant.

Example 3 includes the subject matter of any of Examples 1 and 2, and wherein the circuitry is further to allocate, prior to obtaining the message, the predefined amount of resource capacity to the edge channel.

Example 4 includes the subject matter of any of Examples 1-3, and wherein to allocate the predefined amount of the resource capacity comprises to receive a request to reserve the predefined amount of resource capacity for the edge channel; determine an edge channel identifier associated with the edge channel based on the request; identify the amount of the resource capacity to reserve for the edge channel; and allocate the predefined amount of the resource capacity associated with the edge channel.

Example 5 includes the subject matter of any of Examples 1-4, and wherein to receive the request comprises to receive the request from a service provider.

Example 6 includes the subject matter of any of Examples 1-5, and wherein to allocate the predefined amount of the resource capacity comprises to allocate at least one of a predefined compute capacity, a predefined memory capacity, and a predefined communication capacity to the edge channel.

Example 7 includes the subject matter of any of Examples 1-6, and wherein to allocate the predefined amount of the resource comprises to allocate a predefined number of credits for communication between resources within the device.

Example 8 includes the subject matter of any of Examples 1-7, and wherein to obtain the message comprises to obtain the message from a compute device located at the edge of a network.

Example 9 includes the subject matter of any of Examples 1-8, and wherein to obtain the message comprises to obtain the message from a client compute device, a server compute device, an edge gateway device, or a fog or edge node.

Example 10 includes the subject matter of any of Examples 1-9, and wherein to identify the edge channel based on the metadata associated with the message comprises to identify the edge channel based on an edge channel identifier indicated by the message.

Example 11 includes the subject matter of any of Examples 1-10, and wherein to identify the edge channel based on the metadata associated with the message comprises to identify the edge channel based on a tenant identifier or a service identifier included in the metadata.

Example 12 includes the subject matter of any of Examples 1-11, and wherein to process the message comprises to perform computations on data associated with the message with at least one of the allocated compute capacity, the allocated memory capacity, and the allocated communication capacity.

Example 13 includes the subject matter of any of Examples 1-12, and wherein the circuitry is further to monitor an amount of the resource capacity used by the identified edge channel.

Example 14 includes a method comprising obtaining, by a device, a message associated with a service provided at the edge of a network; identifying, by the device, an edge channel based on metadata associated with the message, the edge channel having a predefined amount of resource capacity allocated to the edge channel to process the message; determining, by the device, the predefined amount of resource capacity allocated to the edge channel; and processing, by the device, the message using the allocated resource capacity for the identified edge channel.

Example 15 includes the subject matter of Example 14, and wherein the edge channel is configured to connect different resources within the device, between the device and another device located at a same edge location, or between the device and another device located at a different edge location to create a communication path dedicated to provide the message for a particular service and/or to a particular tenant.

Example 16 includes the subject matter of any of Examples 14 and 15, and further including allocating, prior to obtaining the message and by the device, the predefined amount of resource capacity to the edge channel.

Example 17 includes the subject matter of any of Examples 14-16, and wherein allocating the predefined amount of the resource capacity comprises receiving, by the device, a request to reserve the predefined amount of resource capacity for the edge channel; determining, by the device, an edge channel identifier associated with the edge channel based on the request; identifying, by the device, the amount of the resource capacity to reserve for the edge channel; and allocating, by the device, the predefined amount of the resource capacity associated with the edge channel.

Example 18 includes one or more machine-readable storage media comprising a plurality of instructions stored thereon that, after being prepared for execution, cause a compute device that executes the prepared instructions to obtain a message associated with a service provided at the edge of a network; identify an edge channel based on metadata associated with the message, the edge channel having a predefined amount of resource capacity allocated to the edge channel to process the message; determine the predefined amount of resource capacity allocated to the edge channel; and process the message using the allocated resource capacity for the identified edge channel.

Example 19 includes the subject matter of Example 18, and further including a plurality of instructions that in response to being prepared for execution cause the compute device to allocate, prior to obtaining the message and by the device, the predefined amount of resource capacity to the edge channel.

Example 20 includes the subject matter of any of Examples 18 and 19, and wherein to allocate the predefined amount of the resource capacity comprises to receive a request to reserve the predefined amount of resource capacity for the edge channel; determine an edge channel identifier associated with the edge channel based on the request; identify the amount of the resource capacity to reserve for the edge channel; and allocate the predefined amount of the resource capacity associated with the edge channel.

What is claimed is:

1. A device comprising:
   one or more non-transitory machine-readable storage media storing instructions;
   at least one memory;
   a processor to execute the instructions in the one or more non-transitory machine-readable storage media to cause the device to:
   obtain a message associated with a service provided at an edge of a network;
   identify an edge channel assigned to the service based on metadata associated with the message, the edge channel having a predefined amount of resource capacity allocated to the edge channel to process messages associated with the service, wherein the edge channel is configured to connect different resources between the device and another to create a communication path dedicated to communicate the messages associated with the service;
   determine a set of resources allocated to the edge channel;
   assign an edge channel identifier to uniquely identify the edge channel, the edge channel identifier further indicating a portion of the determined set of resources allocated to the edge channel;
   determine the predefined amount of resource capacity allocated to the edge channel based on the edge channel identifier; and
   process the message using the allocated resource capacity for the identified edge channel.

2. The device of claim 1, wherein the processor is to execute the instructions to further cause the device to allocate, prior to obtaining the message, the predefined amount of resource capacity to the edge channel.

3. The device of claim 2, wherein to allocate the predefined amount of the resource capacity comprises to:
   receive a request to reserve the predefined amount of resource capacity for the edge channel;
   determine the edge channel identifier associated with the edge channel based on the request;
   identify the amount of the resource capacity to reserve for the edge channel; and
   allocate the predefined amount of the resource capacity associated with the edge channel.

4. The device of claim 3, wherein to allocate the predefined amount of the resource capacity comprises to allocate at least one of a predefined compute capacity, a predefined memory capacity, and a predefined communication capacity to the edge channel.

5. The device of claim 4, wherein to process the message comprises to perform computations on data associated with the message with at least one of the predefined compute capacity, the predefined memory capacity, and the predefined communication capacity.

6. The device of claim 3, wherein to receive the request comprises to receive the request from a service provider.

7. The device of claim 3, wherein to allocate the predefined amount of the resource comprises to allocate a predefined number of credits for communication between resources within the device.

8. The device of claim 1, wherein to obtain the message comprises to obtain the message from a compute device located at the edge of the network.

9. The device of claim 1, wherein to obtain the message comprises to obtain the message from a client compute device, a server compute device, an edge gateway device, or a fog or edge node.

10. The device of claim 1, wherein to identify the edge channel based on the metadata associated with the message comprises to identify the edge channel based on the edge channel identifier indicated by the message.

11. The device of claim 1, wherein to identify the edge channel based on the metadata associated with the message comprises to identify the edge channel based on a tenant identifier or a service identifier included in the metadata.

12. The device of claim 1, wherein the processor is to execute the instructions to further cause the device to monitor an amount of the resource capacity used by the identified edge channel.

13. A method comprising:
obtaining, by a device, a message associated with a service provided at an edge of a network;
identifying, by the device, an edge channel assigned to the service based on metadata associated with the message the edge channel having a predefined amount of resource capacity allocated to the edge channel to process messages associated with the service, wherein the edge channel is configured to connect different resources between the device and another device to create a communication path dedicated to communicate the messages associated with the service;
determining a set of resources allocated to the edge channel;
assigning an edge channel identifier to uniquely identify the edge channel, the edge channel identifier further indicating a portion of the determined set of resources allocated to the edge channel;
determining, by the device, the predefined amount of resource capacity allocated to the edge channel based on the edge channel identifier; and
processing, by the device, the message using the allocated resource capacity for the identified edge channel.

14. The method of claim 13, further comprising allocating, prior to obtaining the message and by the device, the predefined amount of resource capacity to the edge channel.

15. The method of claim 14, wherein allocating the predefined amount of the resource capacity comprises:
receiving, by the device, a request to reserve the predefined amount of resource capacity for the edge channel;
determining, by the device, the edge channel identifier associated with the edge channel based on the request;
identifying, by the device, the amount of the resource capacity to reserve for the edge channel; and
allocating, by the device, the predefined amount of the resource capacity associated with the edge channel.

16. One or more non-transitory machine-readable storage media comprising a plurality of instructions stored thereon that, after being prepared for execution, cause a compute device that executes the plurality of instructions to:
obtain a message associated with a service provided at an edge of a network;
identify an edge channel assigned to the service based on metadata associated with the message, the edge channel having a predefined amount of resource capacity allocated to the edge channel to process messages associated with the service, wherein the edge channel is configured to connect different resources between the device and another device to create a communication path dedicated to communicate the messages associated with the service;
determine a set of resource allocated to the edge channel;
assign an edge channel identifier to uniquely identify the edge channel, the edge channel identifier further indicating a portion of the determined set of resources allocated to the edge channel;
determine the predefined amount of resource capacity allocated to the edge channel based on the edge channel identifier; and
process the message using the allocated resource capacity for the identified edge channel.

17. The one or more non-transitory machine-readable storage media of claim 16, further comprising a plurality of instructions that in response to being prepared for execution cause the compute device to allocate, prior to obtaining the message and by the device, the predefined amount of resource capacity to the edge channel.

18. The one or more non-transitory machine-readable storage media of claim 17, wherein to allocate to predefined amount of the resource capacity comprises to:
receive a request to reserve the predefined amount of resource capacity for the edge channel;
determine the edge channel identifier associated with the edge channel based on the request;
identify the amount of the resource capacity to reserve for the edge channel; and
allocate the predefined amount of the resource capacity associated with the edge channel.

* * * * *